United States Patent
Seong et al.

(10) Patent No.: US 7,366,874 B2
(45) Date of Patent: Apr. 29, 2008

(54) APPARATUS AND METHOD FOR DISPATCHING VERY LONG INSTRUCTION WORD HAVING VARIABLE LENGTH

(75) Inventors: Nak-hee Seong, Kwacheon (KR); Kyoung-mook Lim, Yongin (KR); Seh-woong Jeong, Seoul (KR); Jae-hong Park, Seongnam (KR); Hyung-jun Im, Seoul (KR); Gun-young Bae, Seongnam (KR); Young-duck Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 10/309,295

(22) Filed: Dec. 3, 2002

(65) Prior Publication Data

US 2003/0154358 A1 Aug. 14, 2003

(30) Foreign Application Priority Data

Feb. 8, 2002 (KR) .................................. 2002-7532

(51) Int. Cl.
*G06F 15/76* (2006.01)
*G06F 9/38* (2006.01)
(52) U.S. Cl. .................... 712/24; 712/206; 712/213
(58) Field of Classification Search .................. 712/24, 712/206, 213
See application file for complete search history.

(56) References Cited

U.S. PATENT DOCUMENTS 5,761,506 A * 6/1998 Angle et al. ................ 718/102

| 5,958,044 | A | * | 9/1999 | Brown et al. ............... 712/219 |
| 6,061,786 | A | | 5/2000 | Witt |
| 6,122,722 | A | | 9/2000 | Slavenburg |
| 6,173,389 | B1 | * | 1/2001 | Pechanek et al. ............ 712/24 |
| 6,219,780 | B1 | * | 4/2001 | Lipasti ...................... 712/215 |
| 6,405,300 | B1 | * | 6/2002 | Tremblay et al. ............ 712/24 |

FOREIGN PATENT DOCUMENTS

| EP | 0962856 | 12/1999 |
| EP | 1102165 | 5/2001 |
| JP | 09-167093 | 7/1997 |
| WO | 0104765 | 1/2001 |

OTHER PUBLICATIONS

English translation of JP 09-167093.

* cited by examiner

*Primary Examiner*—Daniel Pan
(74) *Attorney, Agent, or Firm*—F. Chau & Associates, LLC

(57) ABSTRACT

Apparatus and method for dispatching a very long instruction word (VLIW) instruction having a variable length are provided. The apparatus for dispatching a VLIW instruction includes a packet buffer for storing at least one or more VLIW instructions, and a decoding unit configured to constitute a VLIW instruction to be currently executed among the VLIW instructions stored in the packet buffer and decode predetermined bits of each sub-instruction contained in the VLIW instruction. The apparatus dispatches a corresponding sub-instruction to an FU which corresponds to each sub-instruction, based on the results of decoding performed in the decoding unit, position information on the sub-instructions that are placed on the packet buffer, and position information on the sub-instructions that are placed in the current VLIW instruction. Sub-instructions can be effectively dispatched to corresponding FUs using simple decoding logic even in a case where the length of the VLIW instruction is not fixed.

23 Claims, 7 Drawing Sheets

APPARATUS AND METHOD FOR DISPATCHING VERY LONG INSTRUCTION WORD HAVING VARIABLE LENGTH

CROSS-REFERENCE TO RELATED APPLICATION

This application claims priority to Korean Patent Application No. 2002-7532, filed on Feb. 8, 2002, which is incorporated herein by reference in its entirety.

FIELD OF THE INVENTION

The present invention relates to an apparatus and method for processing a very long instruction word (VLIW), and more particularly, to an apparatus and method for dispatching VLIW instructions having variable lengths.

BACKGROUND

To quickly process instructions in a single processor having one operation unit, the execution cycle of the processor should be accelerated. Based on current technology, however, the clock cycle of a microprocessor is near the clock cycle of supercomputers, and thus, the process of acceleration of the execution cycle is limited. Thus, a technique for processing several instructions at a time is needed to improve the execution speed of instructions. Due to the increase in demands for improvement of performance for computer processing, the computer structures have been developed that enable simultaneous execution of multiple instructions.

For example, FIG. 1 is a block diagram illustrating the structure of a conventional very long instruction word (VLIW) processor 100. The VLIW processor 100 schedules a plurality of instructions using a compiler so that several instructions are simultaneously executed. The VLIW processor 100 includes a plurality of functional units (FUs) 141-147, which are controlled periodically by a VLIW instruction and are connected in parallel with one another. The VLIW processor 100 includes issue slots 121-127, which specify specific operations that are performed on the FUs 141-147, respectively, and a register file 190, which transfers operands to the FUs 141-147 and stores the results of operations of the FUs 141-147.

A VLIW instruction used in the VLIW processor 100 comprises a number n of sub-instructions. In a case where a maximum number of VLIW sub-instructions is m, the number of VLIW sub-instructions is represented as 0<n≦m. In a case where the total number of FUs is k, the number (k) of FUs for processing the VLIW sub-instructions is equal to or greater than m, that is, k≧m.

In general, there are two methods for determining FUs on which each sub-instruction should be executed. A first method is to constitute such a VLIW as to have a maximum number (that is, m) of sub-instructions, which is the same as the total number (that is, k) of FUs, as shown in FIG. 1. In this case, sub-instructions to be transmitted to each FU are determined by positions of sub-instructions constituting a VLIW instruction. For this purpose, the number (that is, n) of the sub-instructions should always have the value of m. Thus, the first method may result in program codes being wasted. A second method is to encode information on FUs in sub-instructions. This method is typically used to solve the problem occurring in the first method.

FIG. 2 illustrates a case where information on FUs is encoded together in the sub-instructions. Referring to FIG. 2, respective information, as to which FU a corresponding sub-instruction is to be used for, is encoded in each of sub-instructions 131-136. However, according to the second method, as the number (that is, k) of FUs increases, the length of sub-instructions increases, and the logic for decoding the information on FUs becomes complicated.

SUMMARY OF THE INVENTION

The present invention is directed to an apparatus and method for effectively dispatching sub-instructions, which are contained in a very long instruction word (VLIW) having a variable length, to a corresponding functional unit (FU) using simple decoding logic.

According to one aspect of the present invention, a VLIW processor comprises a dispatch unit for dispatching sub-instructions to a corresponding functional unit (FU) in response to position information on the sub-instructions within the VLIW instruction and for decoding information on the sub-instructions, and at least one or more operation engines, each comprising a plurality of FUs for performing a predetermined operation in response to the sub-instructions that are dispatched by the dispatch unit.

According to another aspect of the invention, an apparatus for dispatching a VLIW comprises a packet buffer for storing at least one or more VLIW instructions, and a decoding unit for arranging sub-instructions of the VLIW instructions stored in the packet buffer to generate a new VLIW instruction to be executed and for decoding predetermined bits of each sub-instruction within the VLIW instruction. The apparatus is preferably included in a VLIW processor having a plurality of functional units.

According to another aspect of the present invention, a method for dispatching a VLIW comprises the steps of: (a) loading the VLIW instruction to a packet buffer; (b) generating a new VLIW instruction based on sub-instructions of the VLIW instructions stored in the packet buffer to be executed and decoding predetermined bits of each sub-instruction of the VLIW instruction; and (c) selecting a corresponding FU which corresponds to each sub-instruction in response to results of decoding performed in step (b), position information on the sub-instructions that are placed on the packet butter, and position information on the sub-instructions contained in the current VLIW instruction.

These and other aspects, object, feature and advantages of the present invention will be described or become apparent from the following detailed description of preferred embodiments, which is to be read in connection with the accompanying drawings.

DETAILED DESCRIPTION OF PREFERRED EMBODIMENTS

Figure 1:
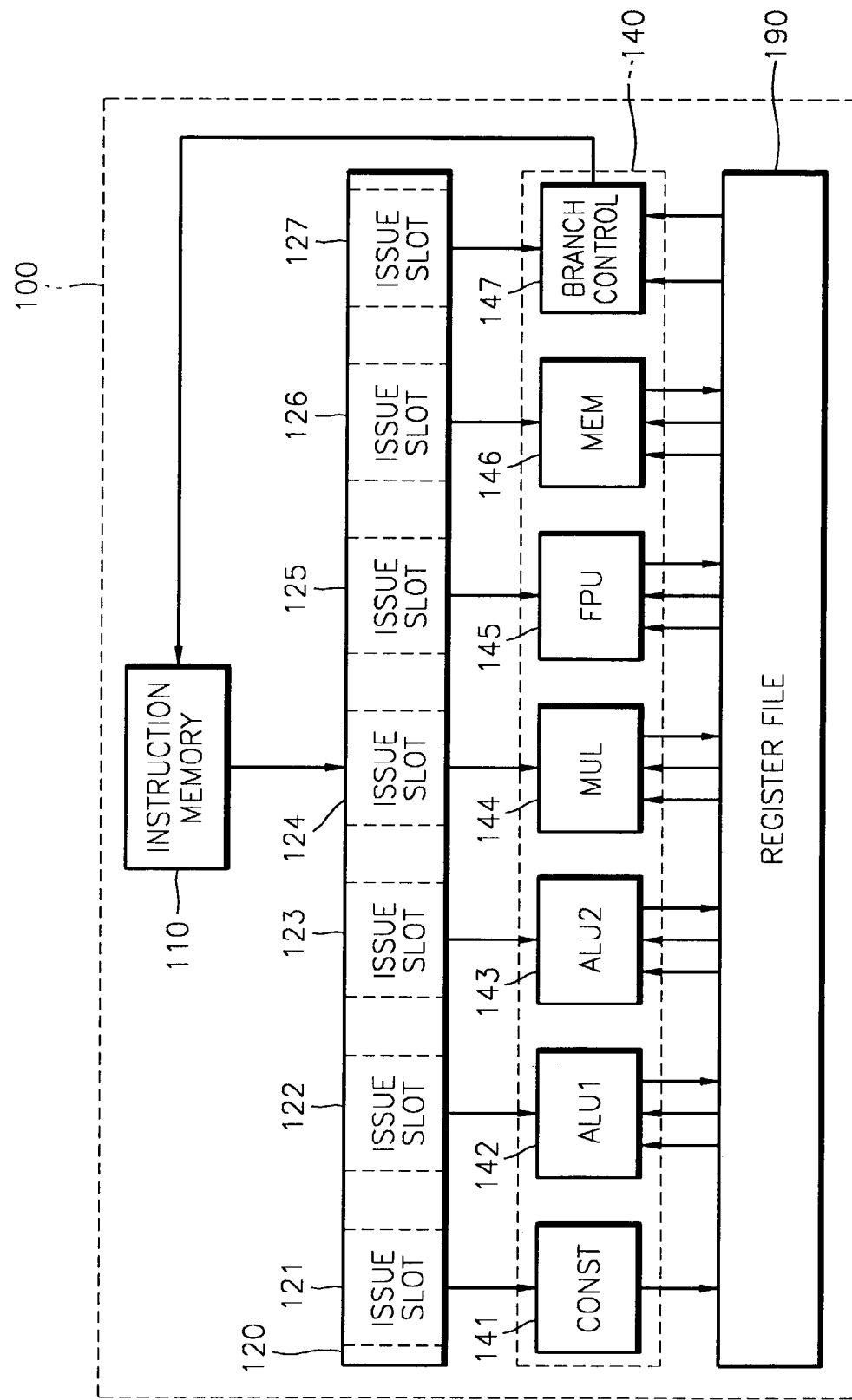
FIG. 1 is a block diagram illustrating the structure of a conventional very long instruction word (VLIW) processor.
Figure 2:
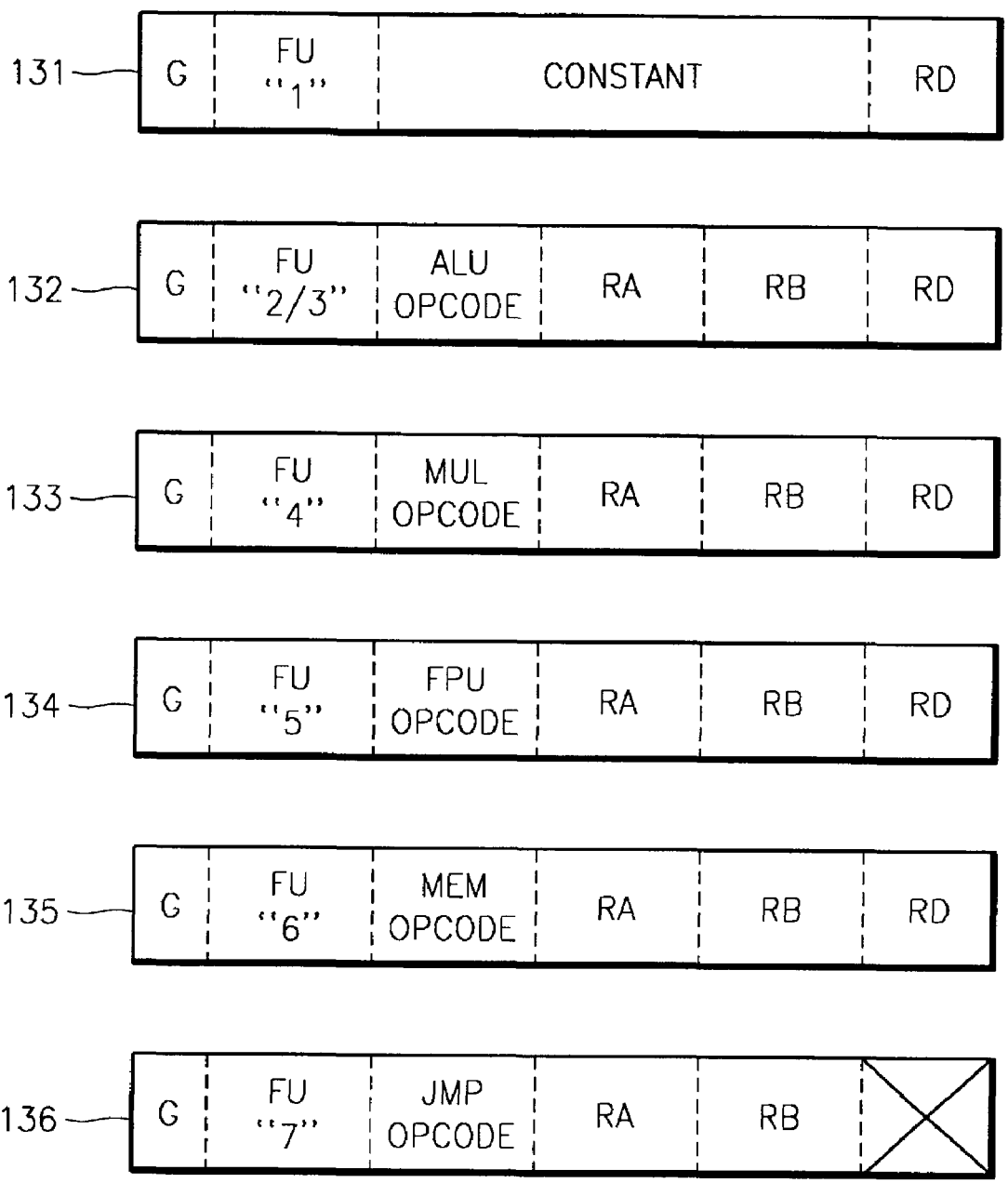
FIG. 2 illustrates a case where information on FUs is encoded together in sub-instructions.

The present invention will be described in more detail with reference to the accompanying drawings in which preferred embodiments of the invention are shown, wherein the same reference numerals refer to the same or similar elements throughout the drawings.

Figure 3:
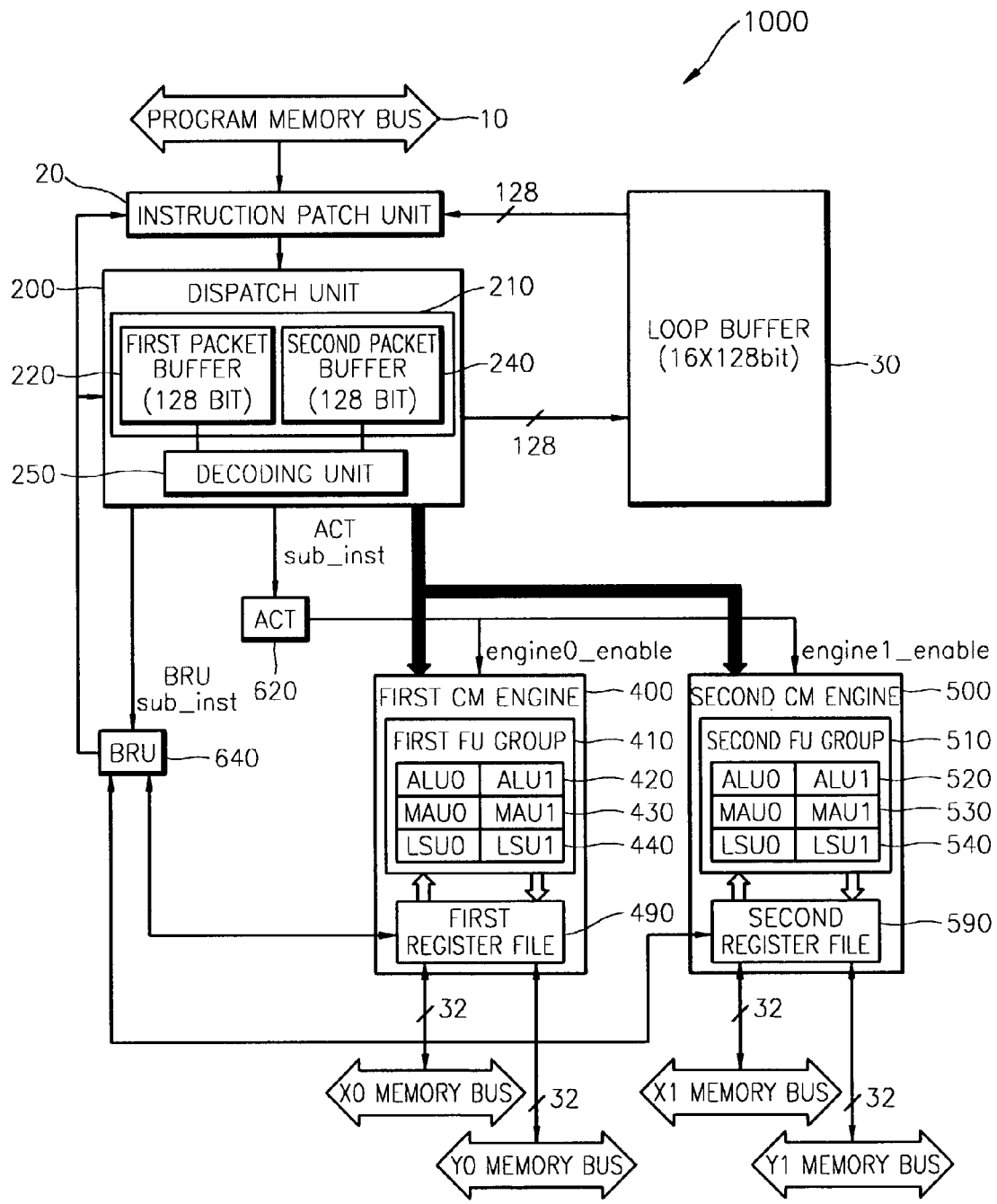
FIG. 3 is a schematic diagram illustrating structure of a VLIW processor having a dispatch unit according to an embodiment of the present invention.

FIG. 3 is a block diagram illustrating a VLIW processor 1000 having a dispatch unit 200 according to an embodiment of the present invention. Referring to FIG. 3, the VLIW processor 1000 comprises an instruction patch unit 20, a loop buffer 30, a dispatch unit 200, a plurality of CM engines 400 and 500, an active engine control unit (ACT) 620, and a branch unit (BRU) 640. The VLIW processor 1000 processes a VLIW instruction having a variable length in which the number of sub-instructions is not fixed.

The instruction patch unit 20 receives the VLIW instruction from a program memory (not shown) via a program memory bus 10. The loop buffer 30 is connected to the instruction patch unit 20 and the dispatch unit 200 and thus receives instructions that are executed repeatedly, from the dispatch unit 200, and provides the instructions to the instruction patch unit 20.

The dispatch unit 200, which comprises a packet buffer 210 and a decoding unit 250, selects functional units (FUs) on which each sub-instruction of the VLIW is to be executed, and transmits a corresponding sub-instruction to a selected FU. However, since there is a difference in the number of sub-instructions that are allocated to each FU, according to the present invention, upper 4 bits of the sub-instructions are decoded to thereby obtain information on the FUs, which corresponds to the value of decoded sub-instructions.

The packet buffer 210 comprises a first packet buffer 220 and a second packet buffer 240, each having a size of 128 bits. The instruction patch unit 20 communicates with a program memory, obtains a program code in unit of 'instruction fetch,' and stores the program code in the first and second packet buffers 220 and 240, respectively, in a pipeline manner. An instruction fetch unit, which is a unit for accessing the program memory, should be greater than or equal to a maximum length (that is, m) of the VLIW instruction so that the VLIW processor builds towards maximum performance. Preferably, the instruction fetch unit according to the present invention is defined as a packet P having 128 bits.

A VLIW instruction stored in the first and second packet buffers 220 and 240 comprises one through 6 sub-instructions, and each sub-instruction comprises an instruction of 20 bits (that is, [19:0]). The VLIW instruction may be stored in the first packet buffer 220 or the second packet buffer 240 at a time or may be stored separately in the first and second packet buffers 220 and 240.

The decoding unit 250 decodes the upper bits of the sub-instructions that are in the VLIW instruction stored in the packet buffer. Although it will be described in detail below, the dispatch unit 200 according to the present invention determines an FU which corresponds to each sub-instruction, based on the results of decoding performed in the decoding unit 250, position information on the sub-instructions that are placed on the packet buffer, and position information on the sub-instructions that are placed in the VLIW instruction to be currently executed. Then, the dispatch unit dispatches a corresponding sub-instruction to a determined FU.

A first and second CM engine 400 and 500 comprise first and second FU groups 410 and 510 (each having a plurality of FU sub-groups FUG0, FUG1, . . . ,), and a first and second register file 490 and 590, which transfer data to the first and second FU groups 410 and 510 and store the results of operations that are performed in the first and second FU groups 410 and 510. Although two CM engines 400 and 500 are shown in FIG. 3, it is understood that other embodiments of the invention comprise a single or multiple CM engines, depending on design.

A first FU sub-group 420 (or 520) (or, "FUG0") comprises first and second arithmetic and logic units (ALUs), and a second FU sub-group 430 (or 530) (or, "FUG1") comprises first and second multiplication and accumulation units (MAUs). A third FU sub-group 440 (or 540) comprises first and second load and store units (LSUs). Here, ALU is an FU on which an arithmetic operation such as addition, subtraction, and logic operation is performed, and MAU is an FU on which multiplication and accumulation of the results of multiplication are performed. In addition, LSU is an FU on which an operation related to data memory access is performed.

In an embodiment where the VLIW processor 1000 comprises a plurality of CM engines, ACT 620 selects an engine to be used from the plurality of CM engines. ACT 620 sets the value of lower bits [1:0] of the sub-instructions belonging to the VLIW instruction to the value of an active-bit [1:0]. The value of the active-bit [1:0] is valid until another sub-instruction which corresponds to ACT 620 is designated, and the first and second CM engines 400 and 500 are enabled by the value of the active-bit [1:0].

BRU 640 receives the sub-instructions that are dispatched from the dispatch unit 200, receives the results of operations of FUs that are transmitted from the first and second register files 490 and 590, and controls the flow of performing a program of the VLIW processor 1000. Sub-instructions for controlling the flow of executing a program include sub-instructions related to branch and H/W loop.

A method for dispatching sub-instructions using the dispatch unit 200 for the VLIW processor 1000 having the above structure will be described below.

Figure 4:
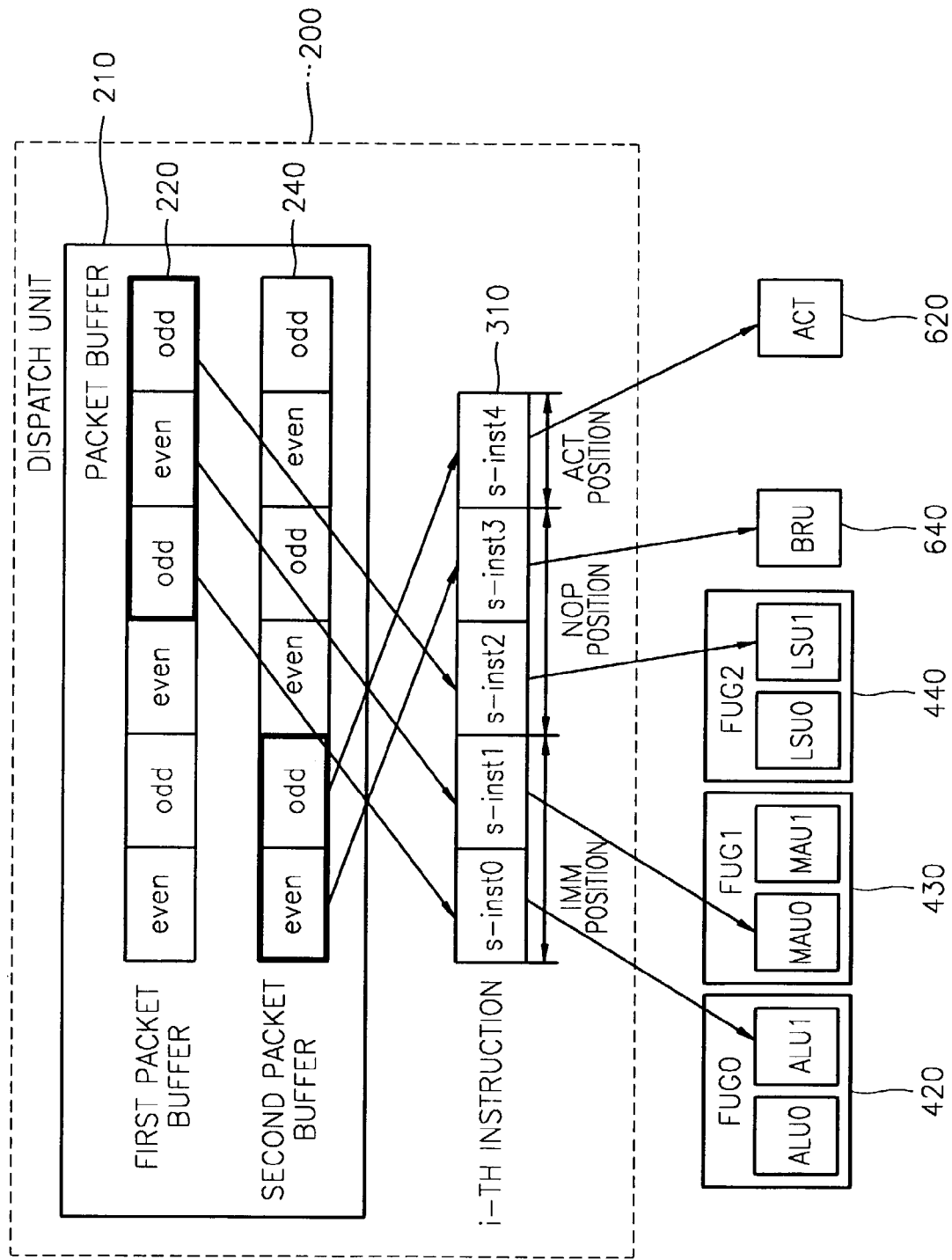
FIGS. 4, 5, and 6 illustrate a dispatch operation for a VLIW instruction having a variable length, which is performed by a dispatch unit according to an embodiment of the present invention.
Figure 5:
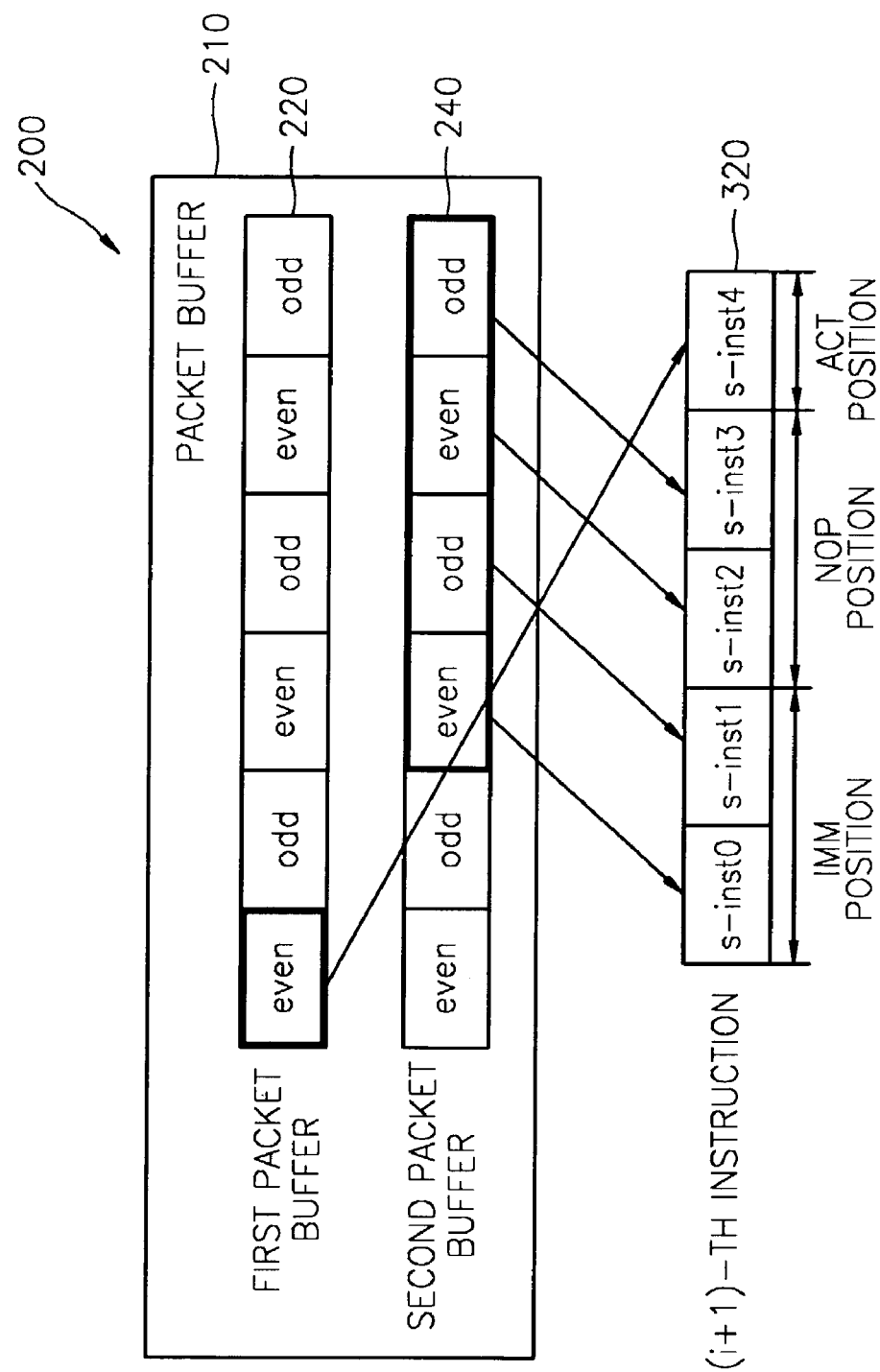
Figure 6:
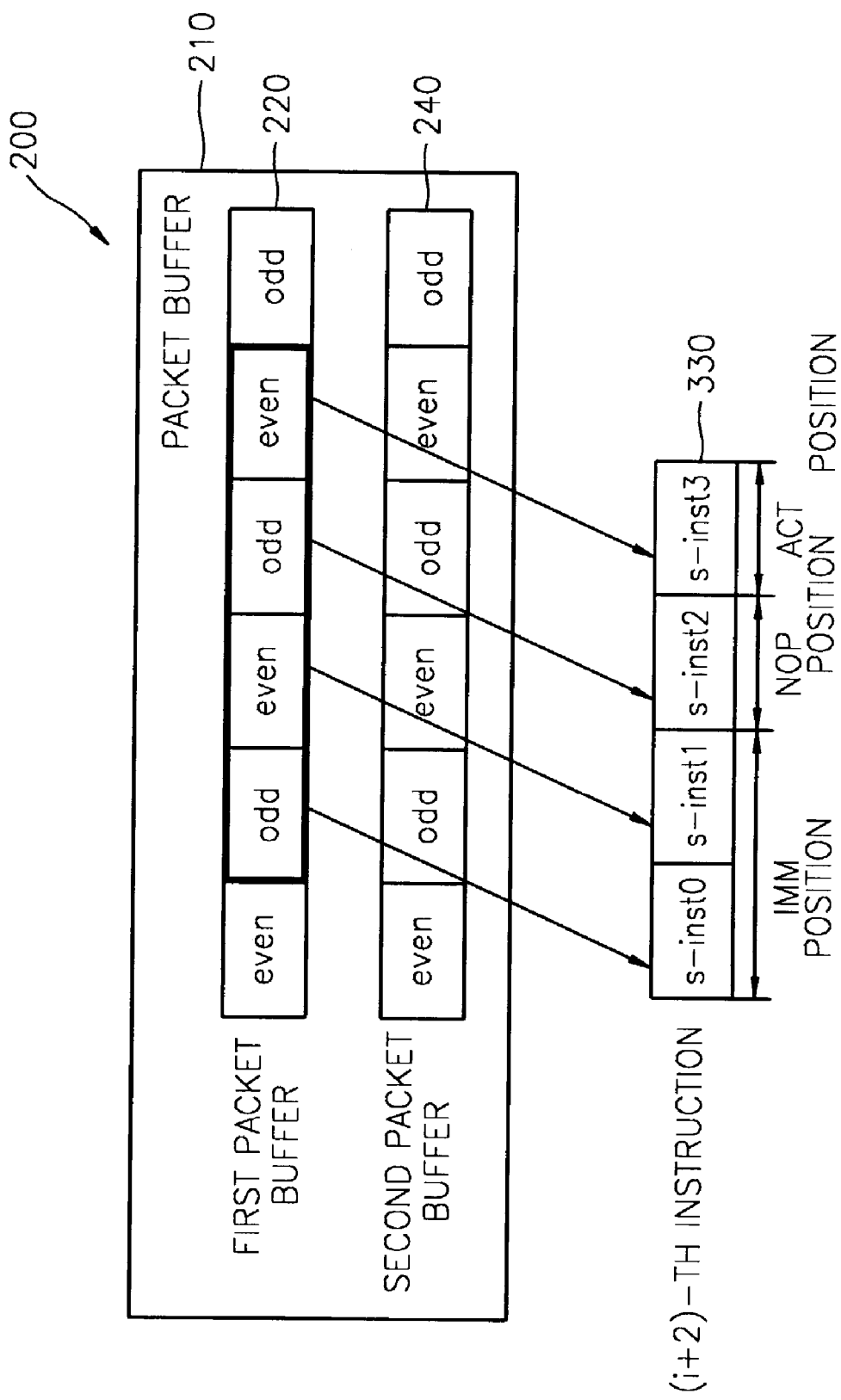

FIGS. 4, 5, and 6 illustrate a dispatch operation for a VLIW instruction having a variable length, which is performed with a dispatch unit according to the present invention.

FIG. 4 illustrates a dispatch operation where a VLIW instruction 310 to be currently executed comprises five sub-instructions (s-inst0-s-inst4), and the VLIW instruction is stored in the first and second packet buffers 220 and 240. FIG. 5 illustrates an operation following the dispatch operation shown in FIG. 4, where the VLIW instruction to be executed comprises five sub-instructions s-inst0 through s-inst4. FIG. 6 illustrates a dispatch operation, which is executed following the dispatch operation shown in FIG. 5, where the VLIW instruction to be currently executed comprises four sub-instructions (s-inst0 through s-inst3).

Referring to FIGS. 4, 5, and 6, the VLIW instruction (as indicated by the bold lines in the drawings) stored in the first or second packet buffer 220 or 240 is represented by reference numerals 310, 320, and 330, respectively. Each VLIW instruction 310, 320, and 330 is a VLIW instruction having a variable length, comprising one through six sub-instructions. Since the first and second packet buffers 220 and 240 for storing the VLIW instruction operate in a pipeline manner, the VLIW instruction may be effectively used.

In view of the operation of the dispatch unit 200 shown in FIG. 4, the VLIW instruction 310 includes an immediate value (IMM) position, a no operation (NOP) position, and an ACT position, depending on positions of sub-instructions comprising the VLIW instruction. In the IMM position, contents of lower bits [15:0] of the sub-instructions represent an immediate value, and the sub-instructions in the IMM position are meaningful when they are used together with a two-word sub-instruction contained in the VLIW instruction on ALU.

Each sub-instruction (s-inst0 through s-inst4) within the VLIW instruction 310 is dispatched via the dispatch unit 200 to an FU which corresponds to sub-instruction. Methods for dispatching sub-instructions using the dispatch unit 200 will be described below.

The dispatch unit 200 decodes the upper 4 bits (that is, [19:16]) of five sub-instructions (s-inst0-s-inst4) that are stored in the first and second packet buffers 220 and 240 using the decoding unit 250.

As a result of decoding, When the value of the decoded upper 4 bits is "0010", "0011", "0100", "0101", "0110", "0111", or "1110", either ALU0 or ALU1 is selected as FU which corresponds to one of the five sub-instructions (s-inst0-s-inst4). For example, if a corresponding sub-instruction is stored as odd data of the packet buffer, such as the first sub-instruction (s-inst0) shown in FIG. 4, the ALU1 is selected as an FU which corresponds to the sub-instruction. If a corresponding sub-instruction is stored as even data of the packet buffer, the ALU0 is selected as an FU which corresponds to the sub-instruction.

When the value of the decoded upper 4 bits is "0000" or "0001", either MLU0 or MLU1 is selected as an FU which corresponds to a sub-instruction. For instance, if a corresponding sub-instruction is stored as odd data of the packet buffer, MLU1 is selected as an FU which corresponds to the sub-instruction. If a corresponding sub-instruction is stored as even data of the packet buffer, such as the second sub-instruction shown in FIG. 4, MLU0 is selected as an FU which corresponds to the sub-instruction.

When the value of the decoded upper 4 bits is "1000", "1001", "1010", "1011", or "1100", either LSU0 or LSU1 is selected as an FU which corresponds to one of five sub-instructions (s-inst0-s-inst4). For example, if the value of the decoded upper 4 bits is "1110", the BRU is selected as an FU which corresponds to the sub-instruction.

When the value of the upper 4 bits of the sub-instructions in the IMM position within the VLIW instruction 310 is "1111", and a two-word sub-instruction on ALU is within the same VLIW instruction 310, a corresponding sub-instruction is a meaningful IMM sub-instruction. For example, as a result of decoding, when the value of the upper 4 bits of the five sub-instructions (s-inst0-s-inst4) is "1110", a corresponding sub-instruction is a two-word sub-instruction. In this case, another sub-instruction is required, and this is an IMM sub-instruction.

When the value of the decoded upper 4 bits is "1111", and a corresponding sub-instruction is in the ACT position, the five sub-instructions (s-inst0-s-inst4) are dispatched to ACT 620. When the value of the decoded upper 4 bits is "1111", and a corresponding sub-instruction is not in the ACT position and the IMM position, the five sub-instructions (s-inst0-s-inst4) are in the NOP position. As described above, the IMM position, the NOP position, and the ACT position are effective when the value of the upper bits of the five sub-instructions (s-inst0-s-inst4) is "1111", and the IMM position, the NOP position, and the ACT position, respectively, are determined based on positions of sub-instructions in the VLIW instruction. That is, first and second sub-instructions within the VLIW instruction are in the IMM position, and a last sub-instruction within the VLIW instruction, which is not in the IMM position, is in the ACT position. The other sub-instructions, excluding the IMM position and the ACT position from the VLIW instruction, are in the NOP position.

According to such a dispatch rule, when each value of the upper 4 bits of the sub-instructions within the VLIW instruction 310 shown in FIG. 4 is "0011", "0001", "1000", "1101", and "1111", respectively, the first sub-instruction (s-inst0) is dispatched to ALU1 included in the first FU sub-group 420, the second sub-instruction (s-inst1) is dispatched to MLU0 that is included in the second FU sub-group 430, and the third sub-instruction (s-inst2) is dispatched to LSU1 that is included in the third FU sub-group 440. The fourth sub-instruction (s-inst3) within the VLIW instruction 310 is dispatched to BRU 620, and the fifth sub-instruction (s-inst4) is dispatched to ACT 640.

For the convenience of explanation, FIG. 4 illustrates a case where each sub-instruction is dispatched to the first FU group 410 included in the first CE engine 400. However, this is only an example. Each sub-instruction may be freely dispatched to an FU group 410 (or 510) that is included in one of the first CE engine 400 and the second CE engine 500, according to the results of decoding.

For example, when the value of the upper bits of the sub-instructions is "0011", the sub-instructions are stored in an odd position of the packet buffer, and the value of the active-bit [1:0] is "11," the sub-instructions are dispatched to ALU1 of the first and second CE engines 400 and 500. When the value of the upper bits of the sub-instructions is "1111", the sub-instructions are stored in an even position of the packet buffer, the value of the active-bit [1:0] is "10," and the sub-instructions are in the IMM position of the VLIW instruction, the sub-instructions are dispatched to ALU0 of the second CE engine 500. When the value of the upper bits of the sub-instructions is "1111" and the sub-instructions are in the ACT position of the VLIW instruction, the sub-instructions are dispatched to ACT 620.

Likewise, an apparatus for dispatching a VLIW instruction having a variable length can effectively dispatch sub-instructions within the VLIW instruction to corresponding FUs using simple decoding logic.

Figure 7:
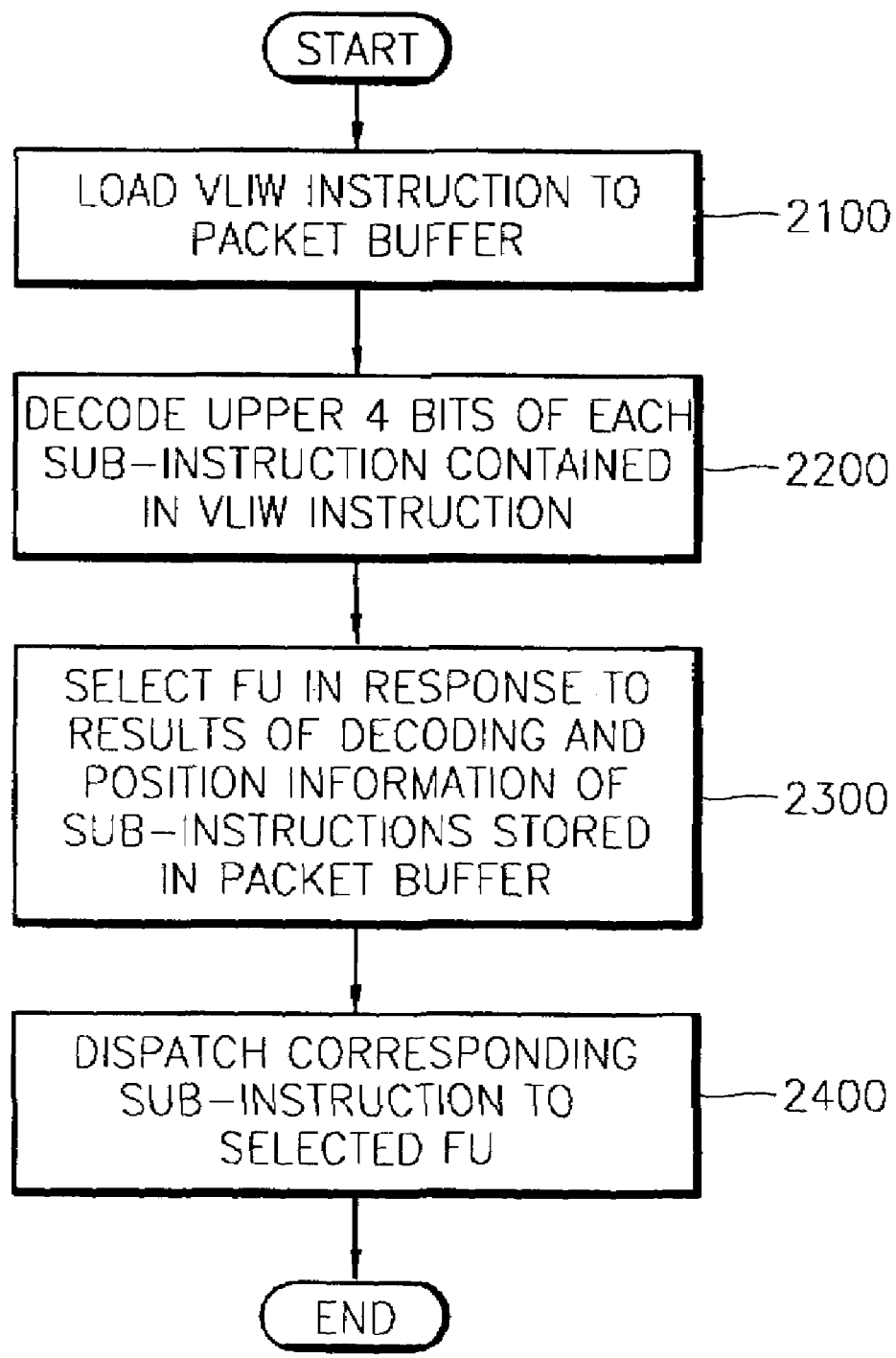
FIG. 7 is a flow chart of a method for dispatching a VLIW instruction according to an embodiment of the present invention.

FIG. 7 is a flow chart of a method for dispatching a VLIW instruction according to an embodiment of the present invention. Referring to FIG. 7, initially, a VLIW instruction comprising sub-instructions is loaded to a packet buffer included in a dispatch unit 200 (step 2100). Then, sub-instructions of the VLIW instruction stored in the packet buffer are arranged to form a new VLIW instruction to be currently executed, and the upper 4 bits of each sub-instruction within the VLIW instruction are decoded (step 2200). An FU which corresponds to each sub-instruction is selected in response to results of decoding, position information on the sub-instructions that are placed on the packet buffer, and position information on the sub-instructions within a newly formed VLIW instruction (step 2300). The position information on the sub-instructions stored in the packet buffer represents whether the corresponding sub-instruction is stored in an odd or even position of the packet buffer. The position information is used to determine which FU is selected from the FUs of the FU groups selected by the results of decoding. After an FU which corresponds to each sub-instruction is selected, the dispatch unit 200 dispatches a corresponding sub-instruction to a selected FU (step 2400).

As described above, with such a configuration of the apparatus and method for dispatching a VLIW instruction having a variable length, sub-instructions can be effectively dispatched to corresponding FUs using simple decoding logic even where the length of the VLIW instruction is not fixed.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A very long instruction word (VLIW) processor, comprising:
    a dispatch unit comprising:
        a packet buffer for storing sub-instructions of a VLIW instruction to be executed; and
        a decoding unit for decoding each sub-instruction within the VLIW instruction to be executed, wherein the dispatch unit dispatches each sub-instruction of the VLIW instruction to a corresponding functional unit (FU) based on (i) decoding results of the sub-instruction, (ii) whether the sub-instruction is stored in an odd or even position in the packet buffer; and (iii) whether the sub-instruction is located in an immediate value operation (IMM) position, a no operation (NOP) position, or an active engine control unit (ACT) position within the VLIW instruction to be executed; and
    at least one or more operation engines, each comprising a plurality of FUs for performing a predetermined operation in response to the sub-instructions that are dispatched by the dispatch unit,
    wherein the corresponding functional unit (FU) is chosen from the plurality of functional units of a same type based on the odd or even position in the packet buffer where the sub-instruction is stored.

2. The VLIW processor of claim 1, further comprising:
    an active engine for enabling at least one or more operation engines in response to the sub-instructions that are dispatched by the dispatch unit; and
    a branch unit for controlling the flow of executing a program of the VLIW processor in response to the sub-instructions that are dispatched by the dispatch unit and results of operations of the operation engines.

3. The VLIW processor of claim 1, wherein a length of the VLIW instruction is variable.

4. The VLIW processor of claim 1, wherein each operation engine comprises:
    a first functional unit (FU) block comprising a plurality of arithmetic and logic units (ALUs) for performing an arithmetic operation;
    a second FU block comprising a plurality of multiplication and accumulation units (MAUs) for performing multiplication and accumulation of the results of multiplication; and
    a third FU block comprising a plurality of load and store units (LSUs) for performing an operation related to data memory access.

5. The VLIW processor of claim 1, wherein the decoding unit decodes predetermined bits of each sub-instruction within the VLIW instruction to be executed.

6. The VLIW processor of claim 5, wherein the packet buffer comprises at least two or more packet buffers for loading one or more VLIW instructions in a pipeline manner.

7. The VLIW processor of claim 5, wherein the decoding unit selects one FU block from a plurality of FU blocks included in the operation engines in response to results of decoding performed for each sub-instruction.

8. The VLIW processor of claim 7, wherein the decoding unit dispatches the sub-instructions to an even FU included in a selected FU block when a predetermined sub-instruction is stored in an even position of the packet buffer, and the decoding unit dispatches the sub-instructions to an odd FU included in the selected FU block when a corresponding sub-instruction within the VLIW instruction is stored in an odd position of the packet buffer.

9. The VLIW processor of claim 1, wherein the decoding results of the sub-instructions are obtained by decoding the upper four bits of each of the sub-instructions.

10. The apparatus of claim 1, wherein a type of the corresponding functional unit (FU) is determined based on the decoding results of the sub-instruction.

11. The apparatus of claim 1, wherein the dispatched sub-instruction is dispatched to the corresponding functional unit (FU) based on the IMM, NOP, and ACT positions when the predetermined bits of the sub-instruction have a predetermined value.

12. An apparatus for dispatching a very long instruction word (VLIW) in a VLIW processor having a plurality of functional units (FUs), the apparatus comprising:
    a packet buffer for storing one or more VLIW instructions; and
    a decoding unit for arranging sub-instructions of the one or more VLIW instructions stored in the packet buffer to generate a new VLIW instruction to be executed, and for decoding predetermined bits of each sub-instruction within the new VLIW instruction to be executed,
    wherein each sub-instruction of the new VLIW instruction is dispatched to a corresponding functional unit based on (i) decoding results of the sub-instruction, (ii) whether the sub-instruction is stored in an odd or even position in the packet buffer; and
    (iii) whether the sub-instruction is located in an immediate value operation (IMM) position, a no operation (NOP) position, or an active engine control unit (ACT) position within the new VLIW instruction,
    wherein the IMM, NOP, and ACT positions are arranged sequentially within the new VLIW instruction, the IMM position is occupied by first and second sub-instructions of the new VLIW instruction, the width of each position depends on a number of sub-instructions comprising the new VLIW instruction, and the corresponding functional unit (FU) is chosen from the plurality of functional units of a same type based on the odd or even position in the packet buffer where the sub-instruction is stored.

13. The apparatus of claim 12, wherein the packet buffer comprises at least two or more packet buffers for loading the one or more VLIW instructions in a pipeline manner.

14. The apparatus of claim 12, wherein the length of a VLIW instruction is variable.

15. The apparatus of claim 12 wherein the ACT position is a position occupied by a last sub-instruction within the new VLIW instruction, which is not included in the IMM position.

16. The apparatus of claim 12 wherein the NOP position is a position occupied by sub-instructions within the new VLIW instruction, which are not included in either the ACT position or the IMM position.

17. The apparatus of claim 12, wherein the FUs comprise a plurality of ALUs for performing an arithmetic operation, a plurality of MAUs for performing multiplication and accumulation of the results of multiplication, a plurality of LSUs for performing an operation related to data memory access, and a branch unit for controlling the flow of executing a program of the VLIW processor.

18. A method for dispatching a very long instruction word (VLIW) instruction in a VLIW processor having a plurality of functional units (FUs), the method comprising the steps of:

loading one or more VLIW instructions to a packet buffer;

generating a new VLIW instruction based on sub-instructions of the one or more VLIW instructions stored in the packet buffer to be executed;

decoding predetermined bits of each sub-instruction of the new VLIW instruction; and dispatching each sub-instruction of the new VLIW instruction to a corresponding functional unit based on (i) decoding results of the sub-instruction, (ii) whether the sub-instruction is stored in an odd or even position in the packet buffer; and (iii) whether the sub-instruction is located in an immediate value operation (IMM) position, a no operation (NOP) position, or an active engine control unit (ACT) position within the new VLIW instruction, wherein the corresponding functional unit is chosen from the plurality of functional units of a same type based on the odd or even position in the packet buffer where the sub-instruction is stored.

19. The method of claim 18, wherein the one or more VLIW instructions are loaded to at least two or more packet buffers in a pipeline manner.

20. The method of claim 18, wherein the length of the VLIW instruction is variable.

21. The method of claim 18, wherein the FUs comprise a plurality of ALUs for performing an arithmetic operation, a plurality of MAUs for performing multiplication and accumulation of the results of multiplication, a plurality of LSUs for performing an operation related to data memory access, and a branch unit for controlling the flow of executing a program of the VLIW processor.

22. A program storage device tangibly embodying instructions executable by a very long instruction word (VLIW) processor to perform method steps for dispatching a VLIW, the VLIW processor having a plurality of functional units (FUs), the method steps comprising instructions for:

storing one or more VLIW instructions in a packet buffer;

generating a new VLIW instruction based on sub-instructions of the one or more VLIW instructions stored in the packet buffer to be executed;

decoding predetermined bits of each sub-instruction of the new VLIW instruction; and dispatching each sub-instruction of the new VLIW instruction to a corresponding functional unit for execution, the dispatching based on (i) decoding results of the sub-instruction, (ii) whether the sub-instruction is stored in an odd or even position in the packet buffer; and (iii) whether the sub-instruction is located in an immediate value operation (IMM) position, a no operation (NOP) position, or an active engine control unit (ACT) position within the new VLIW instruction, wherein the corresponding functional unit is chosen from the plurality of functional units of a same type based on the odd or even position in the packet buffer where the sub-instruction is stored.

23. An apparatus for dispatching a very long instruction word (VLIW) in a VLIW processor having a plurality of functional units (FUs), the apparatus comprising:

a packet buffer for storing one or more VLIW instructions; and a decoding unit for arranging sub-instructions of the one or more VLIW instructions stored in the packet buffer to generate a new VLIW instruction to be executed, and for decoding predetermined bits of each sub-instruction within the new VLIW instruction; wherein an immediate value operation (IMM) position, a nop operation (NOP) position, and an active engine control unit (ACT) position are arranged sequentially within the new VLIW instruction, the width of each position depending on the number of the sub-instructions comprising the new VLIW instruction;

wherein the IMM position is a position of first and second sub-instructions of the new VLIW instruction, the decoding unit dispatches the sub-instructions to an even FU included in a selected FU block when a predetermined sub-instruction is stored in an even position of the packet buffer, and the decoding unit dispatches the sub-instructions to an odd FU included in the selected FU block when a corresponding sub-instruction within the VLIW instruction is stored in an odd position of the packet buffer.

* * * * *